United States Patent [19]

Lenahan

[11] 3,754,778

[45] Aug. 28, 1973

[54] INDEXING MEANS AND BOOK FOR ORGANIZED HIERARCHICAL SUBJECT MATTER

[76] Inventor: John J. Lenahan, 5107 Mimosa Dr., Bellaire, Tex. 77401

[22] Filed: Feb. 22, 1972

[21] Appl. No.: 228,041

[52] U.S. Cl. .................................................. 283/38
[51] Int. Cl. ............................................. B42f 21/04
[58] Field of Search ........ 283/36–42; 40/359, 78.11, 78.13, 78.15; 281/38

[56] References Cited
UNITED STATES PATENTS 813,748  2/1906  Smith .................................... 283/42
2,369,173  2/1945  Oppenheimer ....................... 283/42

Primary Examiner—Lawrence Charles
Attorney—Pravel, Wilson & Matthews

[57] ABSTRACT

A new and improved indexing means and book for organized hierarchical subject matter provides rapid access to the text for the student or user with an overview of the organization of the subject matter therein, while allowing students to progress in individual sequences through the book in accordance with their understanding of the subject matter.

10 Claims, 3 Drawing Figures

Patented Aug. 28, 1973

3,754,778

INDEXING MEANS AND BOOK FOR ORGANIZED HIERARCHICAL SUBJECT MATTER

CROSS-REFERENCE TO RELATED APPLICATION

The present invention is adapted for use with subject matter arranged in an organized hierarchical structure, as is the subject matter of my earlier U. S. Pat. Application, Ser. No. 78,657, filed Oct. 7, 1970, and copending herewith.

BACKGROUND OF THE INVENTION

1. Field of Invention

The present invention relates to an indexing means and book for organized hierarchical subject matter.

2. Description of Prior Art

Certain of the prior art indexing means used with books permitted the user access to the book in accordance with an organization unrelated to the subject matter content of the book, such as alphabetical, chapter number, or the like. Such prior art indexing means thus afforded the user no insight into, or understanding of, the organization of the subject matter of the book, forcing the student to either read the entire book to understand the organization of the subject matter of the book, or seek outsidea outside assistance to gain such understanding.

Other prior art indexing means used the "programmed learning" technique, instructing the user to proceed to a certain section of the book in accordance with an answer the user provided to specific questions presented in the book. With the "programmed learning" technique, the user easily became confused and lost in trying to adapt and learn his way through the book, due to the lack of an insight into the organization of the subject matter of the book.

SUMMARY OF INVENTION

Briefly, the present invention provides a new and improved indexing means for use with books containing subject matter in the form of an organized, hierarchical structure of levels or tiers of interrelated bite units of the type having basic bites containing the minimum quantum of information necessary to understand a particular concept at a particular level in the organized structure of the book, and having peripheral bites containing information in the form of variants, analogies, examples, questions, definitions and the like to assist the user of the book in understanding the concept presented in the basic bite. The basic bites are set forth on individual basic bite pages and the peripheral bites on peripheral bites pages, in the book.

With the present invention, index tab means are provided for each of the basic bite pages and subordinate tab means are provided for each of the peripheral bite pages. The index tab means for basic bite pages for basic bites at a particular level are of a predetermined length differing from the length of index tab means for basic bite pages at higher and lower levels in the hierarchical structure. Further, the subordinate tab means for the peripheral bite pages are of predetermined lengths chosen so that the user of the book when reading or studying at a particular level in the hierachy in the book can see the index tab means for lower level basic bite pages for only the basic bites of the next lower bite unit level.

It is an object of the present invention to provide a new and improved indexing means and book for organized hierarchical subjct matter.

DESCRIPTION OF PREFERRED EMBODIMENT

The data or information for use in the book with which the present invention is to be used is organized into an hierarchical structure of interrelated specific information elements called "bite units." Each bite unit is composed of two types of elements which are presented to the user or student of the book for information and education, called "bites." There is one "basic bite" and a plurality of associated "peripheral bites" in each bite unit.

Figure 1:
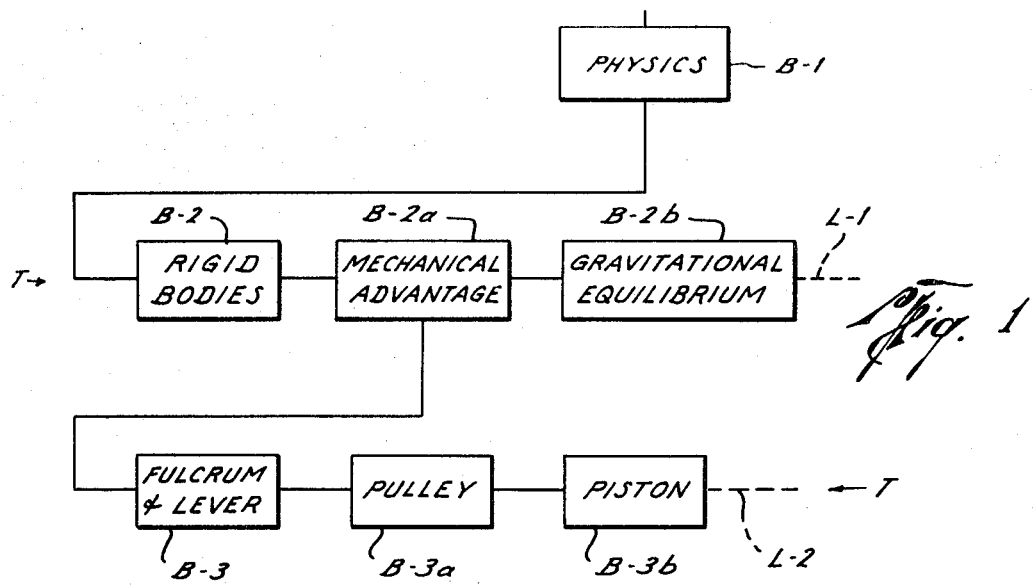
FIG. 1 is a schematic diagram of an organized hierarchical structure for subject matter to be used in the book of the present invention.

Although the present invention may be used with numerous subjects, and the present invention is not related to the information content of the subject presented or thoughts and ideas expressed therein, a brief description of the ordered hierarchical organization of an example topic is made to facilitate understanding of the present invention. Referring now to FIG. 1, the bite units of an example subject matter or topic, "Physics" are illustrated in a plurality of tiers of hierarchies T.

Each bite unit in a tier or hierarchy serves as a focus F for a bite module, which is defined by such bite unit and a plurality of subordinate bite units at lower tiers or hierarchies. For example, the bite unit for Physics, represented by the block B-1 is the focus F for bite units of selected topics in Physics such as the bite unit Rigid Bodies, B-2; the bite unit Mechanical Advantages, B-2a; and the bite unit Gravitational Equilibrium, B-2b. Other bite units, as indicated by a dotted line L-1, may be associated with Physics bite unit B-1. The bite unit B-2a of Mechanical Advantage has associated therewith a plurality of subordinate bite units B-3, B-3a and B-3b of Fulcrum and Lever, Pulley and Piston, respectively, and other bite units as indicated by dotted line L-2.

The bite units within each of the plurality of tiers T are grouped as elements of a corresponding plurality of bite sets of bite bit module defined by the focus F. The bite units of a single tier comprise the fundamental bite set of the associated bite unit at the next higher tier. Each individual tier is also referred to as an individual level or order in the organized hierarchy. For example, the bite units B-3, B-3a and B-3b of Fulcrum and Lever, Pulley and Piston are the fundamental bite set for the associated higher tier bite unit B-2a of Mechanical Advantage.

The bite unit B-2a for Mechanical Advantage defines a bite module for bite units at the next lower level as illustrated by the bite unit B-3 of Fulcrum and Lever, bite unit B-3a of Pulley, and bite unit B-3b of Piston.

Each bite unit includes a basic bite, which is a single element of information or concept in the form of facts, relations, principles, rules, theories, theorems, axioms and the like, regarding the subject matter or topic being presented by the book of the present invention. The basic bite represents the minimal quantum of information regarding such bite unit which the student or trainee must comprehend to understand the subject matter represented by such bite unit B.

Further information regarding the structuring and organization of a subject into an ordered hierarchical structure for use with the present invention may be had by reference to my prior copending U. S. Pat. Application, Ser. No. 78,657, which is incorporated by reference herein for such purpose.

To assist the student in his comprehension of the information in a basic bite concerning the subject matter represented by the bite unit, additional or supplemental information in the form of peripheral bites, are included with bite unit B-3 (FIG. 1).

The pheripheral bites may be arranged in tiers or hierarchies of levels of specificity referring back to such basic bite. The peripheral bites represent reformulations of the specific concept represented by the basic bite or some higher order peripheral bite. The peripheral bites include the following categories: variant, example, definition, analogy, theory, quiz, answer, reason, author note, private note and diagnosis. Peripheral bites referring back to a higher order peripheral bite may be of several categories including categories different from the higher order peripheral bite. Additional categories may be included without change to the subject matter representation scheme.

The following are examples of peripheral bites, reference being made again to my prior co-pending U.S. Pat. Appliclation which is incorporated by reference herein, for further explanation:

a variant peripheral bite restates the specific concept or formulation of the basic bite or a higher order peripheral bite using different terminology or symbolism, previously referred to, or presents the specific concept or formulation from a different viewpoint;

an example peripheral bite provides an illustrative example of the specific concept;

a definition peripheral bite provides a definition of key words, symbols or phrases used in the statement of the specific concept;

an analogy peripheral bite provides an anology to the specific concept;

a theory peripheral bite provides a theoretical explanation and formulation of the specific concept;

a quiz peripheral bite restates the specific concept in interrogative form;

an answer peripheral bite provides the necessary information from which the student or trainee may make a complete, accurate response to a quiz;

a reason peripheral bite provides the rationale for, reasoning behind or explanation of the validity and appropriateness of a specific concept; and an author note peripheral bite provides historical, personal, humorous and other similar information which the author, or person who arranged the topic for presentation, deems to be of possible use or interest to the student.

The data or information in a topic to be presented to the student by the present invention is arranged into a structure of basic bites and associated peripheral bites by the author, an educator or other expert in the particular topic being taught.

The number of bite units within each bite set, the order of bite units therein, called the basic sequence, as well as the number, organization and interrelation of bite sets comprising the block of data for the topic will depend on the subject matter being taught, the skill, background and educational level of the readers, students or trainees, the depth of understanding of the subject matter to be instilled in the student, the length of training time available, and other pertinent educational factors.

Any subject or topic or an overlapping group of several subjects or topics in accordance with the subject matter to be presented in the book may be similarly organized into a plurality of tiers or hierarchies of bite sets, each bite set containing a plurality of basic bites each serving as the focus for a bite module of a plurality of basic bites at lower tiers or hierarchies and a plurality of peripheral bites for each of such basic bites.

The organization of the subject or topic may be carried to any desired degree of generally or specificity in accordance with the educational factors set forth hereinabove.

The number, scope, type, and interrelation of peripheral bites within a bite unit may be correspondingly carried to any desired level of complexity and thoroughness desired by the author in accordance with such educational factors.

After organizing the topic into a hierarchy of bite units, the author specifies an ordered sequence of the bite units to the pages in the book which he feels represents the most logical or the most effective learning sequence in which the topic should be presented to the student or trainee.

The preferred sequential assignment has each Focus bite unit immediately preceding in the order of pages in the book the bite units of the fundamental bite set of such Focus. A suitable procedure for organizing the subject matter to assign bite units to the structure created by the author for the pages of the book is:

a. The author first considers the bite structure origin as the current Focus;
b. The author selects the current Focus and assigns a bite unit number thereto;
c. For the current Focus, the author then examines the fundamental bite set thereof, if one exists, as the current bite set. If none exists, the author proceeds to step (e);
d. If a fundamental bite set exists, it is the current bite set, and the author considers the first bite unit in the basic sequence thereof as the current Focus and then returns to steps (b);
e. For the current bite set, the author considers the next bite unit following the current Focus bite unit, if one exists, as the new current focus and returns to step (b);
f. If there is no next bite unit following the current Focus, the author considers as the new current Focus and current bite set, the Focus of the previous current Focus he has been examining and the bite set containing such Focus. If such Focus is not the bite structure origin, the author returns to step (e). If such Focus is the bite structure origin, the procedure has been completed.

It should be understood that other sequential assignments may be used in accordance with the subject being taught, the intended audience of readers and users of the book, the level of specificity used in the book, the complexity of the subject matter and other factors.

Figure 2:
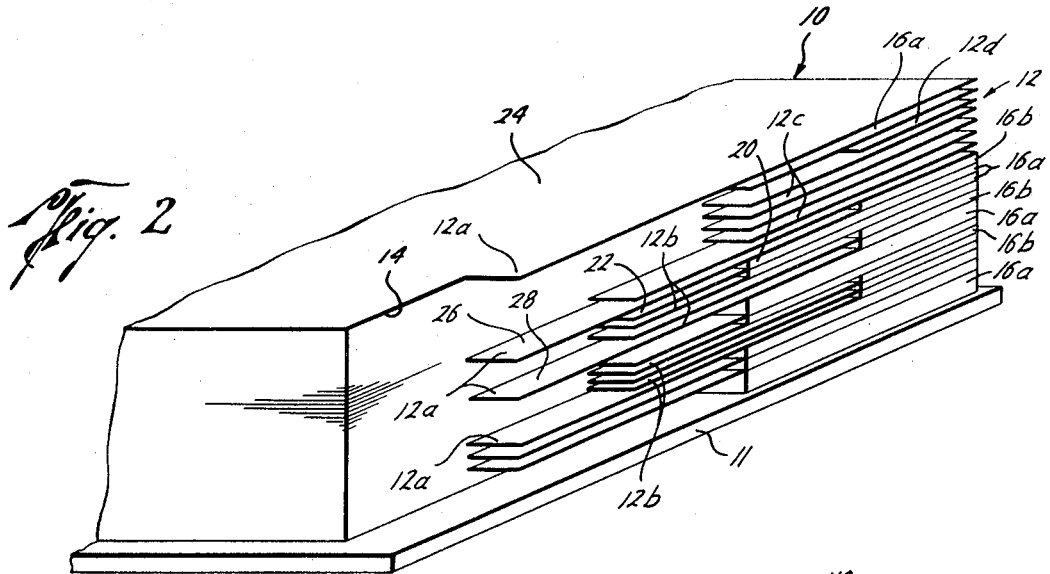
FIG. 2 is an isometric view of the indexing means and book for the present invention.

Referring now to FIG. 2, a book 10, which may be a hard bound book, paperback book, or a loose-leaf notebook is shown, having a rear cover 11. The front cover of the book is not shown in the drawings in order that the present invention may be more clearly understood.

The book 10 has the subject matter and information content thereof set forth in an organized hierarchical structure of tiers of interrelated bite units of the type having basic bites, containing facts, information, theorems and the like in varying degrees of specificity in accordance with the level in the organized hierarchy of tiers of the subject matter. As has been previously set forth, each basic bite represents the minimal quantum of information regarding the bite unit which must be understood to comprehend the subject matter of the bite unit. Further, as has been previously set forth, each basic bite has associated therewith a plurality of peripheral bites containing variants, analogies, examples, questions, definitions, and the like, concerning the information of the basic bites and representing reformulations of the concepts set forth in the basic bites.

The book 10 is organized into $N+2$ levels, $N$ being any non-negative integer. Thus, the book 10 has two or more tiers of interrelated bite units contained therein.

The basic bites in the hierarchical subject matter set forth in the book are set forth on individual pages, called basic bite pages. If the information content requires, supplemental basic bite pages may be used. Each basic bite page has an index tab 12 formed thereon. The supplemental basic bite pages, if used, preferably have the tabs omitted. The tab 12 may be formed by being applied by glue or other suitable adhesive or by cutting away all except the tab 12 from an edge 14 as the basi bite page. The edge 14 may be the top edge, bottom, or side edge, as shown in the drawings (FIG. 2). Distinguishing color, printed matter or other indicia may be placed on either or both sides of the index tabs 12 in order to distingush between index tabs for different bite units or tiers thereof, as will be set forth hereinbelow.

The index tabs 12 for the basic bites at each particular level or tier T in the organized heirarchical subject matter of the book are each of the same predetermined length in a direction substantially parallel to the edge 14 of the page P with which such index tabs 12 are mounted. Further, the index tabs 12 for basic bite pages at different levels or tiers T in the organized hierarchical subject matter of the book are different lengths than index tabs 12 for other tiers T, as will be set forth hereinbelow. the different tab lengths for the index tabs 12 may be referenced from any desired reference position on the page such as, for example, the top or bottom.

Thus, in the portion of the book 10 in bite unit B-1 relating to the subject of Physics set forth on a basic bite page having an index tab (not shown) of a predetermined length, basic bite pages for bite units on the tiers or level T containing bite unit B-2 of Rigid Bodies, bite unit B-2 of a Mechanical Advantage, bite init B-2b of Gravitational Equilibrium, and other bite units relating to other general categories of Physics, such as Heat, Optics, Electricity, Magnetism, and the like each have a tab 12a of a predetermined length, as is evident from the drawings. When the book 10 has additional subjects in bite units at the same tier or order as the bite unit B-1 of Physics, each of such additional subject is set forth on a basic bite page having index tabs (not shown) of a like length to the index tab of the basic bite page for the bite B-1 of physics.

Further, the basic bite pages for bite units in the tier T having the bite unit B-3 of Fulcrum and Lever, the bite unit B-3a of Pulley, and the bite unit B-3b of Pistons have index tabs 12b of a second length shorter than the length of the tabs 12a, as is evident again from the drawings.

In a like manner, lower levels or tiers T in decreasing levels in the organization of the subject matter in the book, such as specifics regarding the bite units B-3, B-3a, and B-3b, having absic bite pages therewith having index tabs of decreasing length, such as the index tabs 12c, and the shorter index tabs 12d, in accordance with the level of the bite unit within the organized hierarchical subject matter of the book 10.

Thus, it can be seen that bite units or order 1, such as the bite unit B-2a of Mechanical Advantage in the book 10 of Physics have index tabs 12a therewith of a first length. Bite units of order number 2, such as the bite unit B-3 of Fulcrum and Lever, have index tabs 12b therewith, shorter than the index tabs 12a. Further the bite units of order 3 and 4 have index tabs 12c and 12d, respectively, formed thereon in accordance with the decreasing order to such bite units of the organized hierarchical subject matter of the book.

As has been previously set forth, each of the basic bites, set forth on the basic bite page having an index tab 12 formed therewith, has a plurality of peripheral bites associated therewith in the organized hierarchical structure of the book 10. The peripheral bites are set forth on peripheral bite pages in the book 10. If desired, the peripheral bite information may begin at the end of the basic bite information on the basic bite page. Each of the peripheral bite pages has a subordinate tab 16 formed therewith in a like manner to the formation of the index tabs 12 previously set forth. The subordinate tabs 16 extend outward from the edges (not numbered) of the peripheral bite pages and extend in a direction parallel to the edges of the peripheral bite pages in predetermined length, as will be more evident hereinbelow.

The length of the subordinate tabs 16 for peripheral bites relating to the basic bites at each of the different levels or tiers in the subject matter are related to the lengths of the index tabs 12 for the basic bites at the same level or tier, providing a ready and available reference for the student in order to grasp and understand the organization and interrelation of the subject matter of the book by examination of the index tabs 12 and subordinate tabs 16 currently visible. In this manner, it has been found that with the present invention, the student or reader is much more able to acquaint himself and adapt himself to the subject matter being presented in the book 10 and thereby more easily learn or understand the subject matter presented.

Considering now the relation of the lengths of the subordinate tabs 16 to the lengths of the index tabs 12, the peripheral bite pages having information thereon in the form of peripheral bites relating to basic bites of order 1, set forth on basic bite pages having the index tabs 12a formed therewith, have subordinate tabs 16a formed thereon. The subordinate tabs 16a are of a like length to the index tabs 12c for basic bites of order number 3. Further, the peripheral bites for basic bites of order number 2, are set forth in peripheral bite pages having subordinate tabs 16b mounted therewith. The subordinate tabs 16b for peripheral bites of order 2 are of substantially the same length as the index tabs 12d for basic bites of order 4.

In the example of FIG. 2, the peripheral bite pages for peripheral bites relating to the basic bites of orders 3 and 4 and having index tabs 12c and 12d respectively, have no subordinate tabs formed therewith, and are coextensive with the edge 14 of the basic bite page having the index tab 12a formed therewith. Since levels 3 and 4 are lowest two levels in the hierarchy, and have no tiers or levels therebeneath, subordinate tabs for peripheral bite pages at these levels are not needed. Since there are not lower basic bite levels, there are no basic bite whose tabs need be masked. p In the use of the present invention, the reader or student reads or studies the book in the normal manner. When reading or studying information of a particular order bite unit in the organized hierarchical subject matter of the book, in the form of either basic bites or peripheral bites, for example, one of the peripheral bite pages having a subordinate tab 16a formed thereon and having the reference number 20 designating same in the drawings (FIG. 2), the reader or student can readily determine the organization of the subject matter of the book. Further, the reader is prevented by the organization of the index tab and subordinate tab structure of the present invention from becoming confused as to the organization of the subject matter.

When holding the book open in the conventional manner and reading a peripheral bite page 20 in bite unit at a level or order N, called a "current bite unit," to designate the bite unit being currently read or studied, the reader or student can readily see the index tab 12b, for the basic bite, designated 22 for convenience, of the first unit in the basic sequence of the fundamental bite set at the next lower level. This occurs since such index tabs 12b are shorter than the index tabs 12a for the current bite unit being studied and for the next subsequent bite unit in the book 10, as has been set forth hereinabove. For ease in understanding the present invention, the pages for the basic bites in the previous, current and subsequent bite units of the current bite set are designated with reference numbers 24, 26 and 28. Further, the index tabs 12b are longer than the index tabs 12c and 12d in other bite units and prevent the reader from seeing the shorter index tabs 12c and 12d for pages unrelated to the bite unit on page 22.

Thus, when reading in the current bite unit on page 20, the reader is prevented by the index tab 12a on page 26 from seeing the index tabs of lower orders, namely orders 2, 3, and 4 of bite units of information in the preceding sections of basic bites and peripheral bites realting to the basic bite set forth on a preceding basic bite page 24 of the book 10.

As has been set forth, the peripheral bite pages relating to a first order basic bite have subordinate tabs 16a of length substantially equal to the index tabs 12c for a third order basic bite. Thus, such subordinae tabs are shorter than, and do not prevent the reader from seeing the second order index tabs 12b within the current bite module. Accordingly, when reading peripheral bite information at the level or order of page 20, and desiring more specific information, the reader can see the index tabs 12b for the second level or next more specific level in the ordered hierarchy of the subject matter.

In a like manner, peripheral bite pages relating to a basic bite page of order N all have subordinate tabs 16 therewith of a like length to the index tabs relating to basic bites of order N+2 in order to permit the reader while reading at order N to readily refer to the first bite unit in the next lower order, N+1, in the organized heirarchical structure of the subject matter of the book 10.

Thus, referring to FIG.1 for further reference, when the reader is studying peripheral bites relating to the current bite unit B-2a of "Mechanical Advantage," the reader is prevented from seeing the index tabs 12 and subordinate tabs 16 relating to the subject of the bite unit B-2 of "Rigid Bodies" in the preceding section of the book by the index tab 12a formed on the "Mechanical Advantage" basic bite page 26. The bite unit B-3 of "Fulcrum and Lever" at the next lower order related to the subject "Mechanical Advantage" on basic bite page 22 is readily seen by the reader. The index tab 12b formed thereon prevents the reader from viewing the index tabs and subordinate tabs of lower orders within the "Fulcrum and Lever" bite module B-3. Further, the next succeeding bite unit of current order, namely "Gravitational Equilibrium," bite unit B-2b, is set forth on the basic bite page 28 having an index tab 12a formed thereon. The index tab 12a for the "Gravitational Equilibrium" basic bite page 28 prevents the reader from seeing the index tabs and subordinate tabs of lower orders within the "Gravitational Equilibrium" bite module B-2b.

In this manner, the reader is able, should be become confused or desire further information, to readily and properly analyze the organization of the subject matter in the book 10 by examination of the index tabs and subordinate tabs currently visible. Accordingly, when reading on the page 20, the reader, should he become confused, may examine the index tabs and determine that he is studying the subject of "Mechanical Advantage" which is a subordinate subject of the broader subject of "Physics" and has a like level of complexity and structure of the coordinate subject of "Rigid Bodies" and "Gravitational Equilibrium," without becoming confused by the specific contents of the coordinate bite units of "Rigid Bodies" and "Gravitational Equilibrium." In this manner, a user of the book, while reading or studying basic bite pages and peripheral bite pages in a bite unit at a particular level in the organized hierarchy, sees only the index tab means for such basic bite page, basic bite pages for basic bites of higher levels which serve as foci to identify bite modules which include the given bite unit, basic bite pages for next basic bites of the aforementioned foci in their respective basic sequences, as well as the first basic page for the next lower level or order having relation only to the particular current bite unit which the reader is currently studying.

Figure 3:
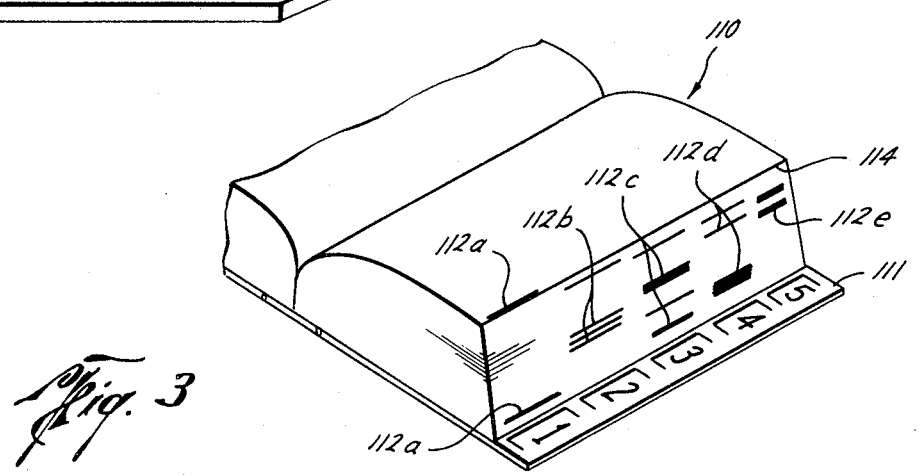
FIG. 3 is an isometric view of an alternative embodiment of the present invention.

It should be understood that the index tabs and subordinate tabs as well as the sequential ordering of bite units to pages of the present invention may take alternative forms. For example, in an alternative book 110 of the present invention (FIG. 3), the index tabs are formed on the basic bite pages by being bled in colord, labels and the like at the edges thereof at predetermined positions in accordance with the order of such basic bite within the organized hierarchical subject matter of the book 110.

The basic bite of order 1 has an index tab 112a formed thereon. Further the order of the basic bite is indicated by numbers, symbols, color code, or other suitable indicia printed on the front and rear covers 111 of the book 110. Similarly, the basic bite pages of orders 2, 3, 4, and 5 are indicated by indicia 112b, 112c, 112d, and 112e, respectively, formed by being bled to an outer edge 114 of the basic bite pages in the book 110. The order of bite units to pages may also be changed. For example, a "Focus-last" sequence may be used wherein every Focus bite unit immediately follows the bite units of its fundamental bite set. In this form, the suborinate tabs need not be used. However, if desired, the peripheral pages may have coded indicia thereon to indicate the level of their associated basic bite in the hierarchy.

It should be understood that the index tabs and subordinate tabs of the present invention may be used as an indexing system for filing systems and that the term "page" as used herein refers to pages or documents in such a filing system.

The foregoing disclosure and description of the invention are illustrative and explanatory thereof, and various changes in the size, shape, and materials as well as in the details of the illustrated construction may be made without departing from the spirit of the invention.

I claim:

1. In a book for subject matter and information set forth in an organized, hierarchical structure containing a plurality of tiers of interrelated bite sets, each bite set composed of a plurality of interrelated bite units each serving as the focus for a bite module of a plurality of subordinate bite units at lower tiers in the hierarchy wherein each bite unit has a basic bite containing facts, concepts, principles, and the like, in varying degrees of specificity in accordance with the level in the organized hierarchy of tiers of the subject matter of such basic bite, with each basic bite representing the minimum quantum of information regarding the bite unit which must be understood by a reader to comprehend the subject matter of the bite unit, and a plurality of peripheral bites, arranged in tiers or hierarchies of levels of specificity associated with the basic bite, containing variants, analogies, examples, questions, definitions, and the like, concerning the information in the basic bite, with each peripheral bite representing a reformulation of the information set forth in the basic bite to serve as a supplement or enhancement to understanding the information contained in the basic bite or other peripheral bite to which it is subordinate, the improvement comprising:

index tabs means for each basic bite page and mounted therewith, each of said index tab means extending outwardly from an edge of the basic bite page, each of said index tab means for basic bites at a particular level in the organized hierarchy of tiers in the subject matter having a predetermined length in a direction parallel to the edge of the page with which said index tab means is mounted, each of said index tab means at different levels in the organized hierarchy of tiers in the subject matter having a different predetermined length in a direction substantially parallel to the edge of the page with which said index tab means is mounted, wherein a user of the book may readily access and understand the organized, hierarchical structure of the subject matter therein in accordance with said index tab means.

2. The structure of claim 1, wherein the subject matter of the book is organized into $N+2$ tiers of interrelated bite units, N being any non-negative integer and wherein:

each of said index tab means at tier $N+1$ in the organized hierarchical structure is of a predetermined length smaller than the length of said index tab means for tier $N$, and a predetermined length greater than the length of said index tab means for tier $N+2$.

3. The structure of claim 2, further including:

subordinate tab means for each peripheral bite page and mounted therewith, each of said subordinate tab means for each peripheral bite page extending outwardly from an edge of the peripheral bite page, each of said subordinate tab means for peripheral bites relating to basic bites at a particular level in the organized hierarchy having a predetermined length in a direction parallel to the edge of the page with which said subordinate tab means is mounted.

4. The structure of claim 3, wherein:

each of said subordinate tab means for a peripheral bite page at level $N$ in the organized hierarchy is of a predetermined length corresponding to the length of said index tab means for basic bite pages at level $N+2$ in the organized structure, wherein a user of the book, while reading or studying peripheral bite pages relating to a basic bite at level $N+1$ in the organized hierarchy, sees index tab means for the current basic bite, the next basic bite in the sequence of the book at level $N+1$, the initial basic bite of the fundamental bite set at level $N+2$, higher order basic bites defining bite modules containing said basic bite at level $N+1$, next basic bites of all higher level basic bites in their respective basic sequences, and subordinate tab means for peripheral bite pages at level $N+1$ relating to such basic bite.

5. The structure of claim 1, further including:

subordinate tab means for each peripheral bite page and mounted therewith, each of said subordinate tab means for each peripheral bite page extending outwardly from an edge of the peripheral bite page, each of said subordinate tab means for peripheral bites relating to basic bites at a particular level in the organized hierarchy having a predetermined length in a direction parallel to the edge of the page with which said subordinate tab means is mounted.

6. An indexing means for use with subject matter and information set forth in an organized, hierarchical structure containing a plurality of tiers of interrelated bite sets, each bite set composed of a plurality of interrelated bite units each serving as the focus for a bite module of a plurality of subordinate bite units at lower tiers in the hierarchy wherein each bite unit has a basic bite containing facts, concepts, principles, and the like, in varying degrees of specificity in accordance with the level in the organized hierarchy of tiers of the subject matter of such basic bite, with each basic bite representing the minimum quantum of information regarding the bite unit which must be understood by a reader to comprehend the subject matter of the bite unit, and a plurality of peripheral bites, arranged in tiers of heirarchies of levels of specificity associated with the basic bite, containing variants, analogies, examples, questions, definitions, and the like, concerning the information in the basic bite, with each peripheral bite representing a reformulation of the information set forth in the basic bite to serve as a supplement or enhancement to understanding the information contained in the basic bite or other peripheral bite to which it is subordinate, comprising:

index tab means for each basic bite and mounted therewith, each of said index tab means extending outwardly from an edge of the basic bite page, each of said index tab means for basic at a particular level in the organized hierarchy of tiers in the subject matter having a predetermined length in a direction parallel to the edge of the page with which said index tab means is mounted; each of said index tab means at different levels in the organized hierarchy of tiers in the subject matter having a different predetermined length in a direction parallel to the edge of the page with which said index tab means is mounted, wherein a user of the book may readily understand the organized, hierarchical structure of the subject matter therein in accordance with said index tab means.

7. The structure of claim 1, wherein the subject matter of the book is organized into N+2 tiers of interrelated bite units, N being any positive real number, and wherein:

each of said index tab means at tier N+1 in the organized hierarchical structure is of a predetermined length smaller than the length of said index tab means for tier N, and a predetermined length greater than the length of said index tab means for tier N+2.

8. The structure of claim 2, further including:

subordinate tab means for each peripheral bite page and mounted therewith, each of said subordinate tab means for each peripheral bite page extending outwardly from an edge of the peripheral bite page, each of said subordinate tab means for peripheral bites relating to basic bites at a particular level in the organized hierarchy having a predetermined length in a direction parallel to the edge of the page with which said subordinate tab means is mounted.

9. The structure of claim 3, wherein:

each of said subordinate tab means for a peripheral bite page at level $N$ in the organized hierarchy is of a predetermined length corresponding to the length of said index tab means for basic bite pages at level $N+2$ in the organized structure, wherein a user, while reading or studying basic bite pages and peripheral bite pages relating to a basic bite at level $N+1$ in the organized hierarchy, sees index tab means for the current basic bite, the next basic bite in the sequence at level $N+1$, the initial basic bite of the fundamental bite set at level $N+2$, higher order basic bites defining bite modules containing said basic bite at level $N+1$, next basic bites of all higher level basic bites in their respective basic sequences, and subordinate tab means for peripheral bite pages at level $N+1$ relating to such basic bite.

10. The structure of claim 1, further including:

subordinate tab means for each peripheral bite page and mounted therewith, each of said subordinate tab means for each peripheral bite page extending outwardly from an edge of the peripheral bite page, each of said subordinate tab means for peripheral bites relating to basic bites at a particular level in the organized hierarchy having a predetermined length in a direction parrallel to the edge of the page with which said subordinate tab means is mounted.

* * * * *